(12) United States Patent
Anand

(10) Patent No.: US 10,911,433 B1
(45) Date of Patent: Feb. 2, 2021

(54) NETWORK TRAFFIC DISTRIBUTION USING CERTIFICATE SCANNING IN AGENT-BASED ARCHITECTURE

(71) Applicant: Amazon Technologies, Inc., Seattle, WA (US)

(72) Inventor: Manu Anand, Hyderabad (IN)

(73) Assignee: Amazon Technologies, Inc., Seattle, WA (US)

(*) Notice: Subject to any disclaimer, the term of this patent is extended or adjusted under 35 U.S.C. 154(b) by 287 days.

(21) Appl. No.: 15/717,767

(22) Filed: Sep. 27, 2017

(51) Int. Cl.
| | | |
|---|---|---|
| *H04L 29/06* | (2006.01) | |
| *H04L 29/08* | (2006.01) | |
| *H04L 9/32* | (2006.01) | |

(52) U.S. Cl.
CPC ........ *H04L 63/0823* (2013.01); *H04L 9/3247* (2013.01); *H04L 67/1004* (2013.01)

(58) Field of Classification Search
CPC ....... H04L 9/00; H04L 63/0823; H04L 63/20; H04L 9/3263; H04L 9/32; H04L 9/0866; H04L 9/0894; H04L 9/3247; H04L 67/1004; H04L 9/14; H04L 9/08; H04L 29/06; H04L 63/0861; H04W 12/06
See application file for complete search history.

(56) References Cited

U.S. PATENT DOCUMENTS

| | | | | |
|---|---|---|---|---|
| 6,745,327 | B1 * | 6/2004 | Messing | G06F 21/32 713/156 |
| 7,152,158 | B2 | 12/2006 | Watanabe et al. | |
| 7,546,454 | B2 * | 6/2009 | Novack | H04L 63/0823 713/156 |
| 9,692,603 | B2 * | 6/2017 | de Andrada | H04L 9/3263 |
| 2003/0037234 | A1 * | 2/2003 | Fu | H04L 9/3268 713/158 |

OTHER PUBLICATIONS

Cooper, M., et al., "Internet X.509 Public Key Infrastructure: Certification Path Building," Request for Comments: 4158, Informational, Sep. 2005, 81 pages.

(Continued)

*Primary Examiner* — Thanhnga B Truong
(74) *Attorney, Agent, or Firm* — Davis Wright Tremaine LLP

(57) ABSTRACT

Systems and methods are disclosed herein for determining the validity of certificates possessed by a plurality of computer system instances operating under a service of a computing resource service provider. A certificate authority may hold an election to determine an intermediary computer system instance among the plurality of computer system instances to communicate between the certificate authority and the plurality of computer system instances. The intermediary instance may receive a set of certificate fingerprints from the plurality of computer system instances. The intermediary instance may compare the set of certificate fingerprints to a valid certificate fingerprint generated using a valid certificate to determine the validity of certificates possessed by the plurality of computer system instances. The intermediary instance may generate a report based on the determination of the validity of the certificates. The certificate authority may modify the instances operating under the service based on the report.

20 Claims, 8 Drawing Sheets

(56) References Cited

OTHER PUBLICATIONS

Cooper, D., et al., "Internet X.509 Public Key Infrastructure Certificate and Certificate Revocation List (CRL) Profile," Request for Comments: 5280, Standards Track, May 2008, 141 pages.
Kent, S., "Privacy Enhancement for Internet Electronic Mail: Part II: Certificate-Based Key Management," Networking Working Group, Request for Comments: 1422, Feb. 1993, 32 pages.

* cited by examiner

NETWORK TRAFFIC DISTRIBUTION USING CERTIFICATE SCANNING IN AGENT-BASED ARCHITECTURE

BACKGROUND

As user demands for computing resources become increasingly complex and diverse, so too the scale and diversity of cloud-based services has increased to match the user demand. In a cloud-based system (e.g., multiple distributed data centers) of a computing resource service provider, various resources of the computing resource service provider may be allocated to each service. In addition, these computing resources are often leveraged in large-scale networks of computing resources to execute a variety of applications and web services. Some service providers have adapted to provide an array of cloud-based services that operate on a certificate-based trust model. For example, computing resources of a service may maintain a certificate demonstrating that the computing resource is a part of the service. However, operating computing resources that have an invalid certificate may cause outages in these large-scale systems, which may decrease efficiency in the services and lead to revenue loss. Moreover, there is not currently an efficient technique for determining which certificate a computing resource possesses.

BRIEF DESCRIPTION OF THE DRAWINGS

Various techniques will be described with reference to the drawings, in which.

DETAILED DESCRIPTION

Figure 1:
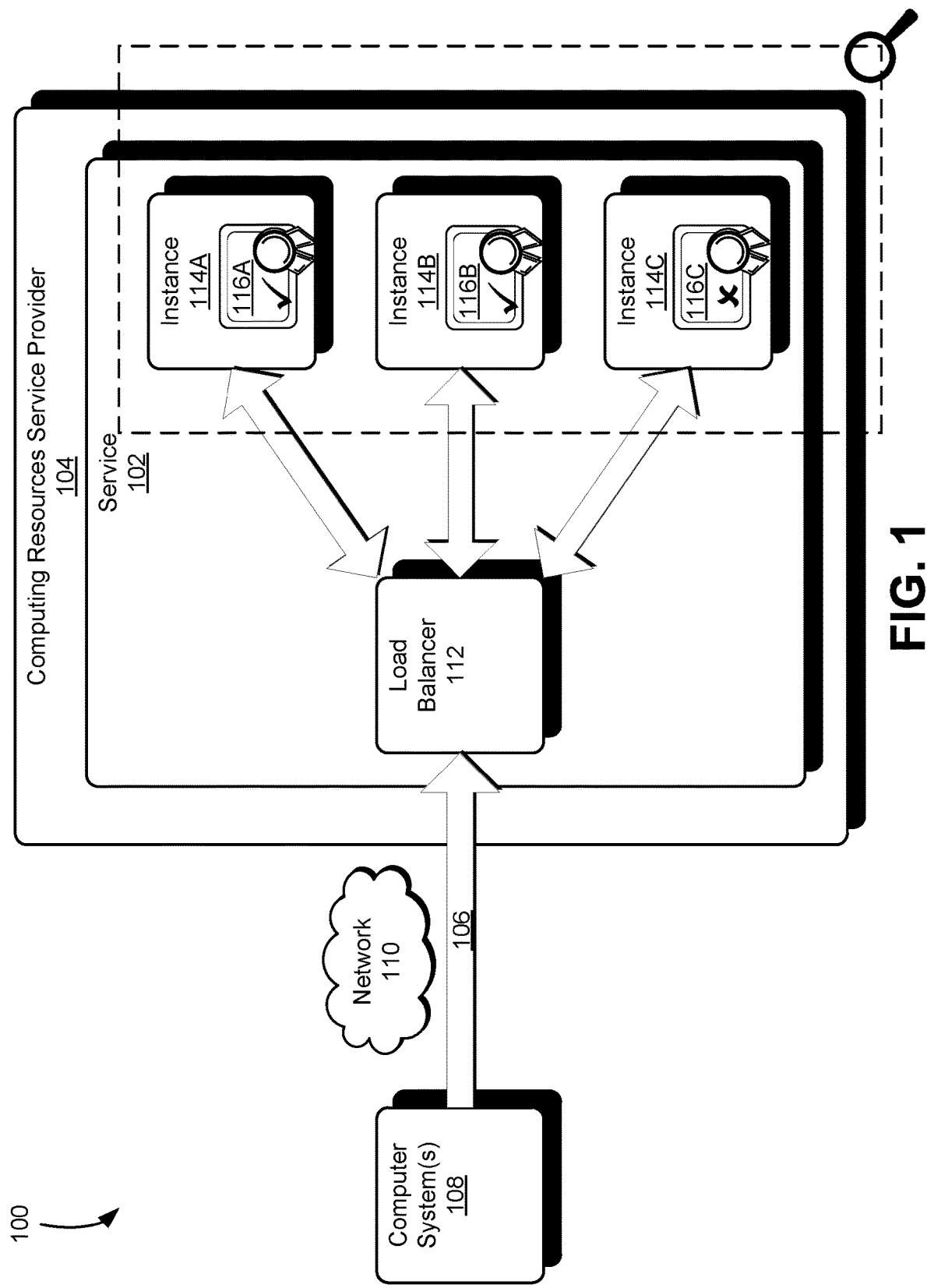
FIG. 1 illustrates an environment in which various embodiments may be practiced.

Techniques described and suggested herein include methods and systems for scanning and maintaining certificates possessed by computer system instances operating under a service of a computing resource service provider. The described and suggested techniques enable determination of which computer system instances possess valid certificates in which computer system instances possess invalid certificates. The techniques also transfer computational load from a certificate authority to an intermediary computer system instance designated to communicate with other computer system instances operating for the service.

The certificate authority may operate in association with a load balancer for distributing data received by the service among the computer system instances to distribute computational load and increase efficiency of the service. The certificate authority may distribute certificates to the instances operating under the service. The certificate authority may also initiate an election to determine which instance is selected as the intermediary computer system instance. The certificate authority may determine which instances will participate in the election, and propose an intermediary instance to those instances participating in the election. Certificate authority may receive a selection from the participating instances and determine which instance is selected as the intermediary computer system instance based on a tally of the selections received. The certificate authority may notify the intermediary instance elected and other instances of the results of the election.

The intermediary instance may communicate with the other instances to determine the validity of the certificates possessed by the other instances. The intermediary instance may send a communication to the other instances requesting the other instances to provide a fingerprint of the certificates that they possess. The intermediary instance may receive a set of certificate fingerprints from the other instances and determine which of the certificate fingerprints correspond to a valid certificate. The determination may include comparing a valid certificate fingerprint generated from a known valid certificate with each of the certificate fingerprints received, and generating a report that may indicate which of the certificate fingerprints matched the valid certificate fingerprint, and/or which of the certificate fingerprints are a mismatch to the valid certificate fingerprint. The intermediary instance may provide report to the certificate authority, which may determine which of the instances do not possess a valid certificate. The certificate authority may cause one or more remediation actions to be performed to prevent instances possessing invalid certificates from receiving data from the load balancer until the instances acquire a valid certificate.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an environment 100 for distributing requests for a service among nodes of a computing resources service provider. A service 102 of a computing resources service provider 104 receives a request 106 from a computer system 108. The service 102 is a computer system configured to provide one or more services of the service provider 104, which may include cryptographic services, data storage services, computing capacity services (e.g., virtual machine provisioning), electronic commerce services, or website hosting services, by way of non-limiting example. The term "computer system" or similar terms (e.g., "computing system") is system implemented using a combination of hardware and software, and may comprise one or more separate computing devices (e.g., servers, personal computers) including a processor and data storage. The service 102 may, for instance, comprise one or more processors and memory that stores executable instructions whose execution by the one or more processors causes the service 102 to perform operations described herein. In some embodiments, the computing resource service provider 104 may provide an environment within which one or more applications, processes, services, virtual machines, and/or other such computer system entities may be executed to provide one or more computing resources to users. In some embodiments, the user may be a person, or may be a process running on one or more remote computer systems, or may be some other computer system entity, user, or process, internal or external to the service provider.

A load balancer 112 of the service 102 may receive the requests 106. The requests 106 may be requests to perform one or more operations provided by the service 102. The computer systems 108 may be one or more computer systems of a user, such as a customer, of the service provider 104 or another service of the service provider 104. The request 106 may be provided over a network 110, such as the internet or a local network of the service provider, and may be provided over a secure or unsecure connection.

The load balancer 112 may be a computer system or virtual computer system including computing resources configured to distribute incoming data received over the network 110 (e.g., network traffic, the requests 106) across a set of nodes the request to nodes 114 assigned to the service 102 in order to optimize resource utilization and/or avoid overloading computing resources. For example, the load balancer 112 may include physical hardware connected to a server rack or otherwise included in a data center. In another example, the load balancer may include one or more virtual machines supported by a server computer. In various embodiments, the load balancer 112 may obtain instance data and/or customer workload data and distribute traffic to computing system instances 114 based at least in part on the obtained instance data and/or customer workload data. The load balancer 112 may receive and transmit data over the network according to one or more protocols, such as a transmission control protocol ("TCP"), an internet protocol ("IP"), secure sockets layer ("SSL"), transport layer security ("TLS"), or other methods for providing communications over a network.

In one embodiment, the load balancer 112 may distribute traffic based at least in part on a capacity of a particular computer system instance indicated in the instance data. The load balancer 112 may be an elastic load balancer that scales the load balance as network traffic changes over time. Although the load balancer 112 is depicted as receiving the request 106 directly, the load balancer 112 may receive the request 106 from an intermediary, such as an interfacing service (e.g., proxy server). The load balancer 112 may distribute the data according to one or more methods known by those of ordinary skill in the art, such as a "round robin" distribution, distribution according to efficiency (e.g., least number of connections sufficient to fulfill the request, least amount of response time sufficient to fulfill the request), or based on data included in the request (e.g., header data, application specific data). The load balancer 112 may be assigned to distribute data to nodes executing code for operations performed by the service 102.

The service 102 includes a plurality of computer system devices that are each capable of executing a computing system instance 114 of a particular type created by the computing resource service provider 104. A computing system instance 114 may also be referred to as a "node" or "host" herein. In one embodiment, the computer system devices (e.g., server computers) include a processor, a data store, an input/output bus, and/or any other component suitable for executing the computing system instances 114. Additionally, the computer system instances 114 may be virtual machine instances. A virtual machine instance is an instance of a software implementation executed on physical machine (e.g., a computer) that executes programs like a physical machine. For example, each of the server computers of the service 102 may be configured to execute an instance manager capable of implementing the computer system instances 114. The instances 114 may operate as a cluster of instances 114 assigned to perform operations for the service 102.

Each of the instances 114 may possess a digital certificate 116 issued by a certificate authority. The load balancer 112 is configured to distribute data to instances 114 possessing a valid digital certificate 116. The load balancer 112 may maintain a record of the instances 114 possessing a valid digital certificate 116, and remove instances 114 from the service 102 that do not possess a valid digital certificate 116. A valid digital certificate, as described herein, refers to a digital certificate including trust information useable to verify that the certificate was issued by an authorized certificate issuing authority, and information useable to verify that the digital certificate is a current version. The digital certificate 116 may be an X.509 certificate, although other digital certificate encodings are also considered as being within the scope of the present disclosure. The digital certificate 116 may include various fields such as a version field, a serial number field, an algorithm identifier field, an issuer field, fields for validity periods, a subject field, fields about the public cryptographic key, issuer unique identifier fields, subject unique identifier fields, extension fields, certificate signature algorithm fields, and a certificate signature field. X.509 certificates are described in RFC 4158, RFC 5280, and RFC 1422, which are incorporated by reference.

One of the instances 114 may be elected to scan the digital certificates 116 to determine whether the instances 114 possess valid digital certificates. The one of the instances 114 may be selected based on an election process initiated by a certificate scanner, as described below in greater detail. The one of the instances 114 may cause the other instances 114 to provide a certificate fingerprint of the digital certificate 116 respectively possessed by each of the instances. The one of the instances 114 elected may scan each of the certificate fingerprints to determine whether the certificate fingerprints are valid by virtue of matching a certificate fingerprint generated using a known valid certificate. As indicated in FIG. 1, for example, the certificates 116A and 116B respectively possessed by the instances 114A and 114B are determined as being valid whereas the certificate 116C possessed by the instance 114C is determined as being invalid. The one of the instances 114 may generate a report indicating the validity of one or more of the digital certificates 116 possessed by the instances 114, and make the report available to a certificate authority responsible for maintaining and managing digital certificates for the instances 114.

Figure 2:
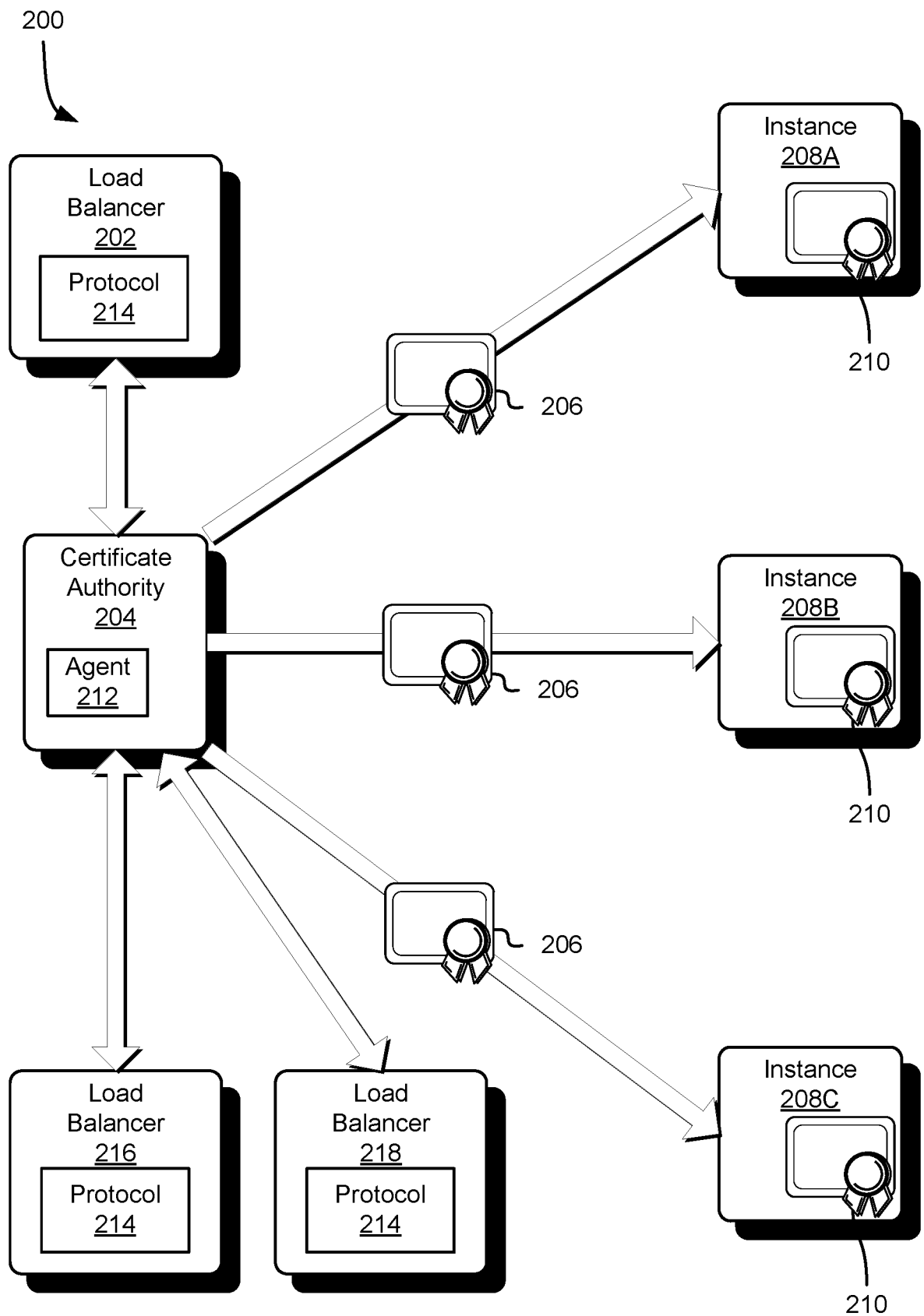
FIG. 2 illustrates an environment for distributing certificates among computer resource instances of a service.

FIG. 2 shows an environment 200 for issuing digital certificates to computing system instances of a service. A load balancer 202, as described with respect to FIG. 1, may communicate with a certificate authority 204 that is a computer system configured to generate, issue, and/or manage digital certificates usable to verify that an entity possessing the digital certificate is authorized to exchange data with the load balancer 202. The certificate authority 204 may be an application layer running on the computer system that performs various operations on behalf of the service associated with the load balancer 202. The certificate authority 204 may be a service of a computing resource service provider, or may be a service external to the service provider that inspects and verifies digital certificates. In one embodiment, the certificate authority 204 may exchange data with a plurality of load balancers, such as the load balancer 202 that distributes data to the instances 208, and other load balancers (e.g., load balancers 216 and 218) assigned to distribute data to other instances. In one embodiment, the certificate authority 204 may be assigned to exchange data with a single load balancer, such as the load balancer 202. The certificate authority 204 may be configured to generate or obtain a current digital certificate 206, for the service of the computing resources service provider, including information for verifying whether the entity possessing the digital certificate is authorized to exchange data with the load balancer 202. Such information may include information for identifying the service, a time period for which the digital certificate is valid, and a digital signature generated using a key of a public-private key pair of the certificate authority 204, such as the public key.

The certificate authority 204 to be configured to distribute the digital certificate 206 to one or more computing system instances 208 of the service. The current digital certificate 206 may replace a previous digital certificate 210, held by one or more of the instances 208, that is invalid. Invalidity may be determined based at least in part on whether cryptographic information matches cryptographic information generated using a private key of the certificate authority 204, and/or whether a current time is included in a period of time indicated by the digital certificate 206 as being a valid period of time. In one embodiment, the digital certificate 206 may be distributed to the instances 208 in response to receiving a request for a current certificate. In one embodiment, the certificate authority 204 may distribute the digital certificate 206 to the instances 208 identified on a record of computing system instances on a periodic basis. For example, the record may identify instances 208 known to the certificate authority 204 to be instances executing instructions for performing operations for the service, and known to possess a previously valid digital certificate. The periodic basis may be a basis corresponding to an appropriate period of time, such as once every 24 hours. Evaluation of the validity of a digital certificate is described in further detail below.

The certificate authority 204 is responsible for performing various functions related to management of digital certificates on behalf of the load balancer 202. In one embodiment, the certificate authority 204 may manage the lifecycle of agents running on the computing system instances 208. The certificate authority 204 may also be responsible for propagating a current certificate to computing system instances 208 determined to be running on behalf of the load balancer 202. The certificate authority 204 may also be responsible for holding an election for determining a leader instance of the computing system instances 208, and notifying the computing system instances 208 of the leader instance elected. Further, the certificate authority 204 may be responsible for updating certificates for one or more computing system instances 208 for which a certificate discrepancy has been detected. The certificate authority 204 may include an agent 212 operating within the certificate authority 204. The agent 212 may be configured to perform one or more functions to aid the certificate authority 204 in furtherance of its delegated functions; for instance, the agent 212 may listen to designated ports for communications from the computing system instances 208, and may provide communications to the computing system instances 208 over the designated ports. The term "agent", as used herein, may refer to an instance of software, such as a computer program, that acts on behalf of a principal resource (e.g., service, computer program) in an agency relationship, and which is delegated with the authority to act on behalf of the principal resource.

The load balancer 202 may operate according to one or more protocols 214 for determining a consensus among a network of entities. An example of the protocol 214 may be a Paxos protocol useable to determine an intermediary instance among the computing system instances 208 as described below. The protocol 214 may include the use of a set of algorithms for determining the consensus and/or programming for executing the set of algorithms. The protocol may define a process comprising two or more phases that includes a voting phase and a commit phase, as described below in further detail.

Figure 3:
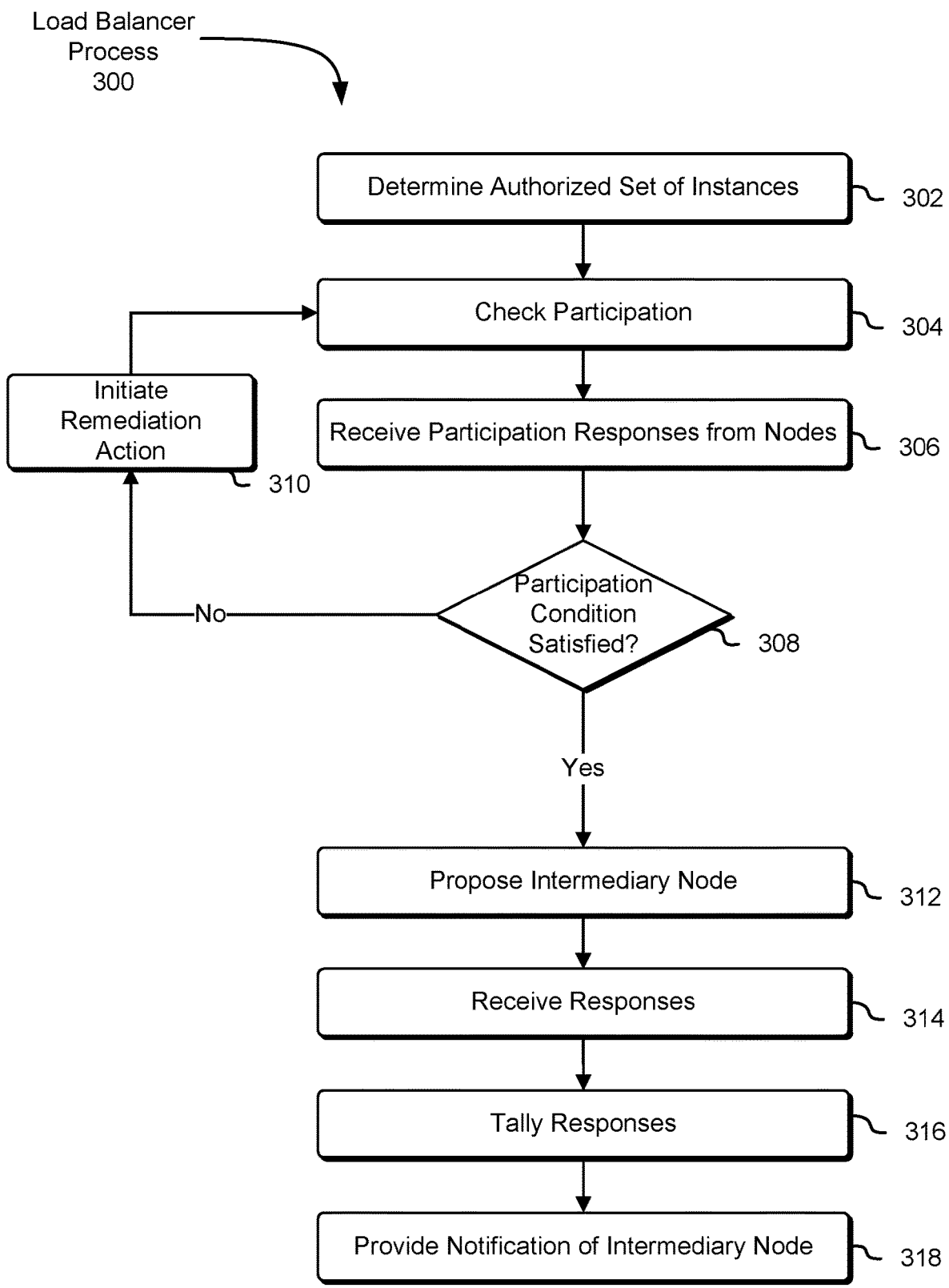
FIG. 3 illustrates a process for conducting an election of an intermediary computer system instance.

FIG. 3 shows a process 300 performed by the load balancer for determining an intermediary instance of the set of computer system instances of a service. The process 300 may be performed by a shim layer that receives and handles application calls, such as an application programming interface call. The "intermediary instance" may also be referred to herein as a "leader instance" or a "master instance," and is discussed in greater detail below. The determination of the intermediary instance may be similar to an election process in which the computer system instances cast votes. The process 300 may be implemented according to the protocol 214 described above with respect to FIG. 2—for instance, the PaxOS protocol for determining an intermediary computer system instance. The process 300 may be performed on a periodic basis, such as once a day, and may be performed at a predetermined time specified in memory, or may be performed in response to the occurrence of a predetermined event.

The process 300 begins by determining 302 a set of computer system instances authorized to participate in the election. The set of instances may be determined based on a record, such as a list, maintained by the certificate authority identifying computer system instances that were determined as implementing hardware and/or software for performing various operations on behalf of the service. Each of the instances may include an agent running thereon to help with certain aspects of maintaining currency of the certificate. Next, the certificate authority checks 304 to determine which of the authorized set of instances will participate in the election. Checking 304 may include sending a communication to the authorized set of instances that causes the authorized set of instances to provide an indication of whether each instance will or will not participate in the election. As discussed below, each instance in the set of instances may include an agent that operates on behalf of the instance to perform various functions.

Checking 304 the participation may include sending a communication invoking an agent application programming interface ("API") call (e.g., CheckParticipationQ) for each instance to accept or decline participation in the election. The certificate authority receives 306 responses from one or more of the authorized set of instances indicating whether the set of instances will participate in the election. In one embodiment, ones of the authorized set of instances that accept participation in the election may send a positive response to the certificate authority (e.g., checkParticipation (YES)), whereas ones of the authorized set of instances that decline or cannot participate in the election may not provide a response. In one embodiment, ones of the authorized set of instances that decline to participate in the election may provide a negative response (e.g., checkParticipation(NO)), and ones of the authorized set of instances that fail to provide a response are also determined as declining to participate in the election.

The certificate authority than determines 308 whether participation conditions for the election process is satisfied. The participation conditions may specify a set of conditions regarding the set of instances that accept participation and the number of authorized instances in the authorized set of instances that must be satisfied for the election to proceed. As one example, the participation condition may specify that 75% of the number of authorized instances must participate in the election for the election process to proceed. The set of conditions may also include conditions regarding the number of the authorized set of instances—for example, if the number of instances in the authorized set of instances is less than a predetermined number (e.g., five instances), then certificate authority may require only a simple majority of the set of instances to accept participation in the election.

If the certificate authority determines that the participation conditions are not satisfied, the certificate authority may cause 310 one or more remediation actions to be initiated to improve the likelihood that the participation conditions will be satisfied. For instance, the certificate authority may cause an agent to be restarted for instances in the authorized set of instances that did not provide a check participation response. As another example, the certificate authority may instruct the load balancer to discontinue distribution of data among the set of instances, wait for a predetermined period of time before checking 304 participation again to allow one or more of the set of instances to complete their current workload. As a further example, the certificate authority may initiate a request to an administrative entity of the service to increase the number of computer system instances available to perform operations or functions for the service. Initiation 310 of remediation actions may be repeated until the participation conditions are satisfied.

In the event that an instance is determined as being active (e.g., the instance returned a response to a node ping) but the agent running on the instance is non-responsive, the certificate authority may perform a remediation action to obtain a response from the agent. The certificate authority may first initiate an action to determine the agent health, which may be performed via an API of the instance exposed to the certificate authority. For example, the certificate authority may initiate a query, such as an API call ping agent( ), to an unresponsive agent to determine whether the agent is either unable to respond or too busy to respond; if the agent responds, the certificate authority may determine that the agent is active and healthy, and does not want to participate in the election. If the agent does not respond, the certificate authority may determine that the agent is unhealthy (e.g., stuck in an infinite loop, software hang-up) and may initiate a remediation action of restarting the agent, for example, by initiating a script causing the computer system instance to restart the agent. The script may be stored in data storage accessible to the certificate authority.

If the participation conditions are satisfied, the certificate authority may propose 312 one of the authorized set of instances to be the intermediary instance of the set of instances. Which of the authorized set of instances is proposed to be intermediary instance may be determined on any appropriate basis, such as by random selection among the authorized set of instances, selection of an instance having a lowest workload among the authorized set of instances, or by selection of the oldest or newest instance instantiated among the authorized set of instances, by way of non-limiting example. Proposing 312 the intermediary node may be performed by invoking an API in each participating instance, such as an API having the format SelectLeader (proposed_instance).

The certificate authority may receive and tally 314 responses from the participating set of instances to the proposal in step 312. The responses may be a response accepting the proposed instance or declining the proposal. A response accepting the proposal may return the same instance proposed (e.g., SelectLeader(proposed_instance)), and a response declining the proposed instance may include a selection specifying a different instance (e.g., SelectLeader (different_instance)). The certificate authority may tally 316 the responses to determine which instance is elected as the intermediary instance. Tallying 316 the responses may include counting the selection for each instance and determining which of the instances received the most selections. In the event of a tie, the certificate authority may return to step 312 and propose a different instance. The certificate authority may then generate and provide 318 a notification to the authorized set of nodes indicating which instance was elected as the intermediary node based on the results of tallying 316 the selections. The notification provided by the certificate authority may be in the form of an API call invoked by the certificate authority, such as SetLeader (instance_selected).

Figure 4:
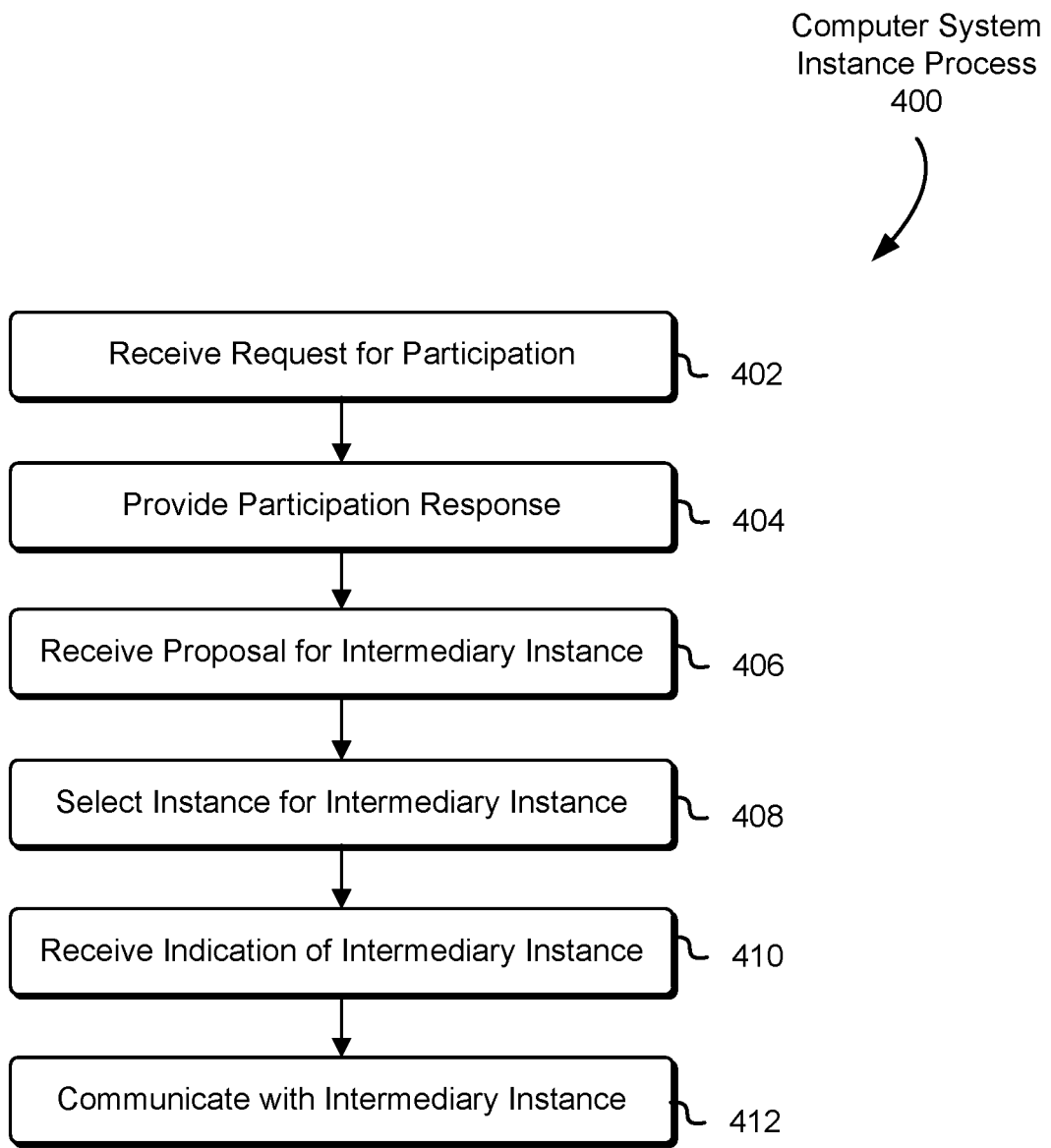
FIG. 4 illustrates a process for participating in the election of the intermediary computer system instance.

FIG. 4 shows a process 400 performed by a computer system instance of the authorized set of instances for selecting the intermediary instance of the set of computer system instances of a service. The process 400 begins by receiving 402 a request for participation from the certificate authority. Receiving the request 402 may include exposing an API of the instance, such as CheckParticipation( ) to the certificate authority, and the certificate authority invoking the API. The instance may then provide 404 a participation response to the certificate authority. The instance may, for example, may provide the response via an affirmative response through the API (e.g., CheckParticipation(YES)), and may include identifying information of the instance. The instance, after providing an affirmative response to the participation request, may receive 406 a communication from the certificate authority proposing an instance of the authorized set of instances to be the intermediary. The proposal may include identification information useable by the instance to identify the proposed instance.

The instance may then select 408 an instance of the authorized set of instances and provide a communication to the certificate authority indicating which instance of the authorized set of instances was selected. Selection 408 of the instance may be provided via an API call, such as SelectLeader(select_instance) where select_instance corresponds to identification information for identifying one of the set of instances. The instance may approve of the proposed selection or may propose a different instance than the proposed instance to be the intermediary instance. The computer system instance may then receive 410, from the certificate authority, an indication of which of the set of instances is determined as the intermediary instance. The indication may be provided via an API call, such as SetLeader(instance_selected) where instance_selected corresponds to identification information useable by the instance to identify one of the set of instances. The instance may communicate 412 with the intermediary instance via a port assigned or designated to the intermediary instance to receive a certificate status request from the intermediary node.

Figure 5:
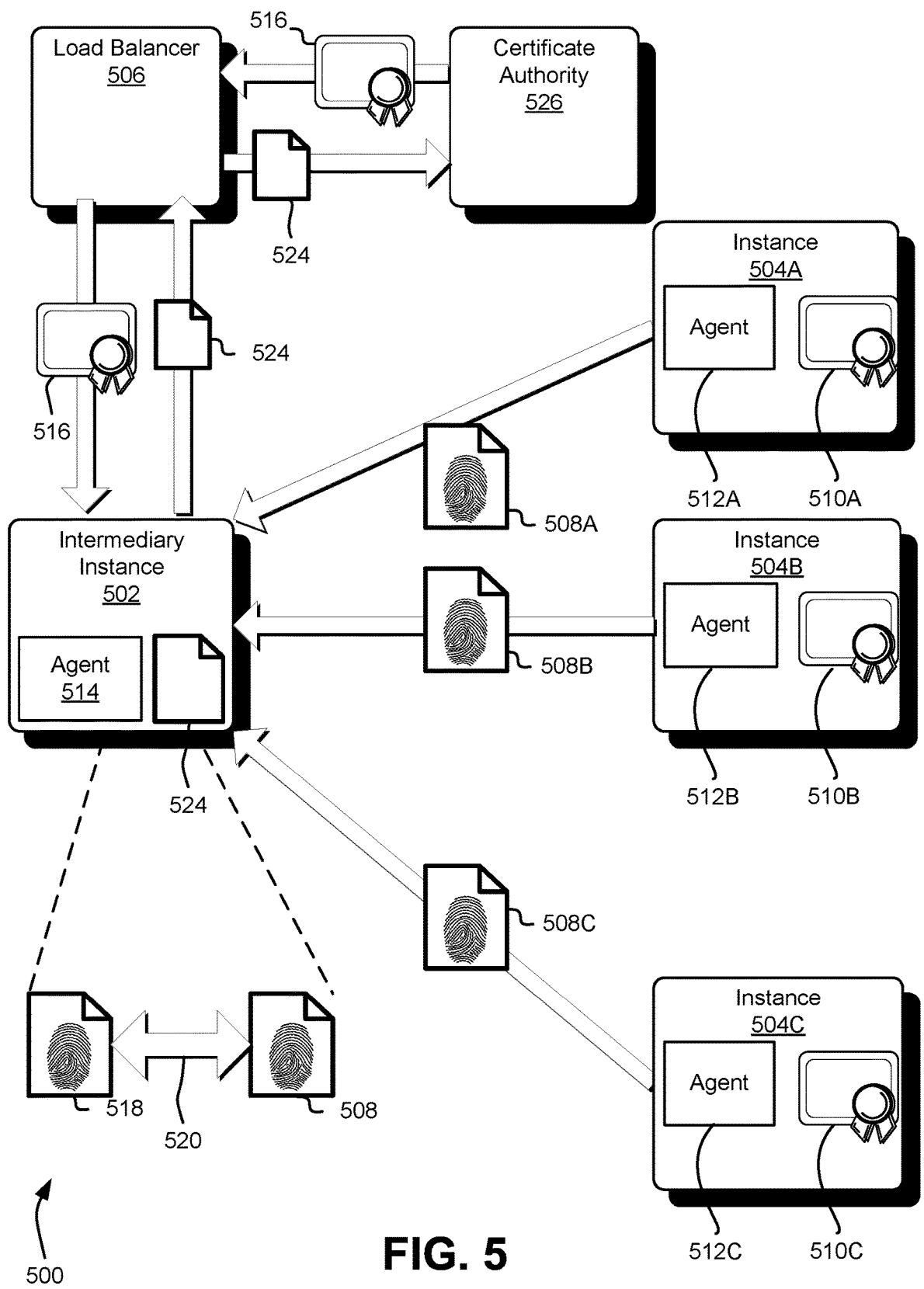
FIG. 5 illustrates an environment for verifying certificates possessed by computer system instances.

FIG. 5 illustrates an environment 500 of a service of a computing resources service provider in which an intermediary computer system instance 502 facilitates a certificate scanning process. The intermediary instance 502 is a computer system instance elected according to the processes 300 and 400 described above with respect to FIGS. 3 and 4. A set of computer system instances 504, each having received a notification from a load balancer 506 designating the intermediary instance 502, are configured to send a certificate fingerprint 508 to the intermediary 502. The certificate fingerprint 508 may be the result of performing a function using a digital certificate 510 possessed by one of the instances 504 as an input to produce a value unique to the digital certificate. The certificate fingerprint may be generated by using any appropriate function for generating digital fingerprints known to those of ordinary skill in the art, such as performing method for generating a certificate fingerprint according to an X.509 specification, such as according to the standards discussed in RFC 5280. Generating the digital fingerprint may include using a certificate as an input to a hash function (e.g., MD5 Algorithm, Keyed-Hash Message Authentication Code, Secure Hash Algorithm, BLAKE) using the digital certificate 510 as an input. For example, the certificate fingerprint 508A provided to the intermediary instance 502 by the instance 504A may be an MD5 checksum generated by performing an MD5 algorithm using the digital certificate 510A possessed by the instance 504A as an input. The instances 504 may each provide identification information in association with the certificate fingerprint 508, respectively identifying the instance 504 providing the certificate fingerprint 508.

The instances 504 may generate the certificate fingerprint 508 in response to a predetermined event. In one embodiment, the instances 504 may generate the certificate fingerprint 508 in response to time information indicating that it is a certain time of day. In one embodiment, the instances 504 may generate the certificate fingerprint 508 in response to determining that a certain amount of time has elapsed is generating the last certificate fingerprint 508. In one embodiment, the instances 50 for me generate the certificate fingerprint 508 in response to receiving a request to generate the certificate fingerprint 508. For example, the intermediary instance 502 (or the load balancer 506) may provide a request to generate the certificate fingerprint 508, and provide the certificate fingerprint 508 the intermediary instance 502. The instances 504 may supply the digital fingerprint 508 using a PUT request formatted as follows:
PUT http:://LEADER:AGENT_PORT/update_certificate_to_leader&cert_id=CERT_FINGERPRINT_ID
where LEADER identifies the intermediary instance 502, AGENT_PORT is a port designated for the intermediary to listen to, and CERT_FINGERPRINTID is a digital fingerprint generated of the certificate 510.

Each of the instances 504 (e.g., 504A, 504B, 504C) may include executable instructions that, as a result of execution by the instance 504, causes the instance 504 to perform one or more operations in the scope of the particular service. For instance, for a cryptographic service, the instances 504 may have instructions installed thereon that perform one or more cryptographic operations based on data received by a load balancer of the service. As another example, for a data storage service, the instances 504 may have instructions installed thereon that perform one or more data storage operations based on data received by a load balancer of the service. Each instance 504 may also include an agent 512 that is installed to perform operations facilitating certificate scanning and maintenance in concert with the intermediary instance 502 and the load balancer 506. The agent 512 is started via a start agent script executed as a result of receiving a command to do so from a computer system of the service, such as the load balancer 506. At startup, the agent opens an internal endpoint (e.g., socket) at the instance 504 for receiving or transmitting data, and listens to communications received over the endpoint. The endpoint opened by each of the agents 504 may share address information, such as by having the same port number or network address, such that a communication addressed to an address having the address information will be received by the agents 512 listening to the endpoint.

The intermediary instance 502 receives the certificate fingerprints 508 from the instances 504 and determines which of the instances 504 possess a current certificate based on the certificate fingerprints 508 provided. The certificate fingerprints 508 provided by the instances 504 may be received, for example, by an agent 514 of the intermediary instance 502. The intermediary instance 502 may obtain a current digital certificate 516 and generate a digital fingerprint 518 using the same method for producing a digital fingerprint performed by the instances 504—for example, by using the current digital certificate 516 as an input to a hash function. The intermediary instance 502 may determine which instances 504 possess a valid digital certificate 510 matching the current digital certificate 516 based at least on a comparison 520 between the certificate fingerprint 518 and each of the certificate fingerprints 508 received. The intermediary instance 502 may determine which instances 504 possess an invalid digital certificate 510 that does not match the current digital certificate 516 by at least comparing the certificate fingerprint 518 to each of the certificate fingerprints 508 received.

The intermediary instance 502 may then generate a record 524, based on the comparisons 520, indicating which instances 504 having a certificate 510 matching the valid certificate 516, and instances having a certificate 510 that is a mismatch to the valid certificate 516. The record 524 may, for example, map valid certificates 510 in association with identification information associated with the respective instances 504 possessing the valid certificates 510. Conversely, the record 524 may, for example, map invalid certificates 510 in association with identification information associated with the respective instances 504 possessing the invalid certificates 510. Identification information may be any appropriate information suitable for identifying a specific instance 504, such as a host name or host address of the instance 504. The intermediary instance 502 (and the instances 504) may maintain a record, such as a list, of identification information (e.g., host name or address) of the instances that are configured to operate for a particular service. Each instance may update the record based on a communication received from an administrative entity, such as the load balancer 506, indicating the instances equipped to operate under the service.

The intermediary instance 502 may provide the record 524 to the load balancer 506 using an appropriate method, such as an HTTP request. For instance, the HTTP request may be a POST request indicating the instances 504 possessing a certificate 510 matching the valid certificate 516, and may be formatted as follows:
POST http://cert_authority.service_provider.com:8080/update_tcp_lb_results&cert_id=CERT_FINGERPRINT_ID&hosts=HOST_NAMES
where cert_authority identifies a destination corresponding to the load balancer 506, CERT_FINGERPRINT_ID corresponds to a valid certificate fingerprint 518, and HOST_NAMES corresponds to identification information for the instances 504 possessing a certificate 510 producing a fingerprint 508 matching a fingerprint 518 of the valid certificate 516. Providing the record 524 may correspond to transmitting the record 524 over a network. The record 524 may be provided or transmitted to the load balancer 506 as part of, or along with, another document.

The load balancer 506 may perform one or more actions based on the communication 524. For instance, the load balancer 506 may provide information to another layer of the load balancer indicating identification information for the nodes 504 among which data for the service may be distributed. The load balancer may be configured not to remove those instances 504 from a distribution record that do not have a certificate 510 matching the valid certificate 516. The intermediary instance 502 may notify instances 504 determined as not possessing a certificate 510 producing a fingerprint 508 matching the fingerprint 518 that they possess invalid certificates. The instances 504 possessing invalid certificates may perform one or more remediation actions to retrieve the current version 516 of the digital certificate, as described below in greater detail. According to the environment 500 described above, the intermediary instance 502 may scan digital certificates of the instances 504 using a decentralized method in which an intermediary instance determines which instances possess a valid certificate, and communicates with the certificate authority to identify instances possessing valid certificates and/or invalid certificates. The load balancer 506 may obtain the valid certificate 516 from a certificate authority 526 and provide the report 524 to the certificate authority 526, as described below. In one embodiment, the certificate authority 526 may be an entity external to the service provider (e.g., third-party certificate authority) that inaccessible by and/or to the instances 504 (including the intermediary instance 502). In one embodiment, however, the certificate authority 526 may be a service provided by the service provider.

Figure 6:
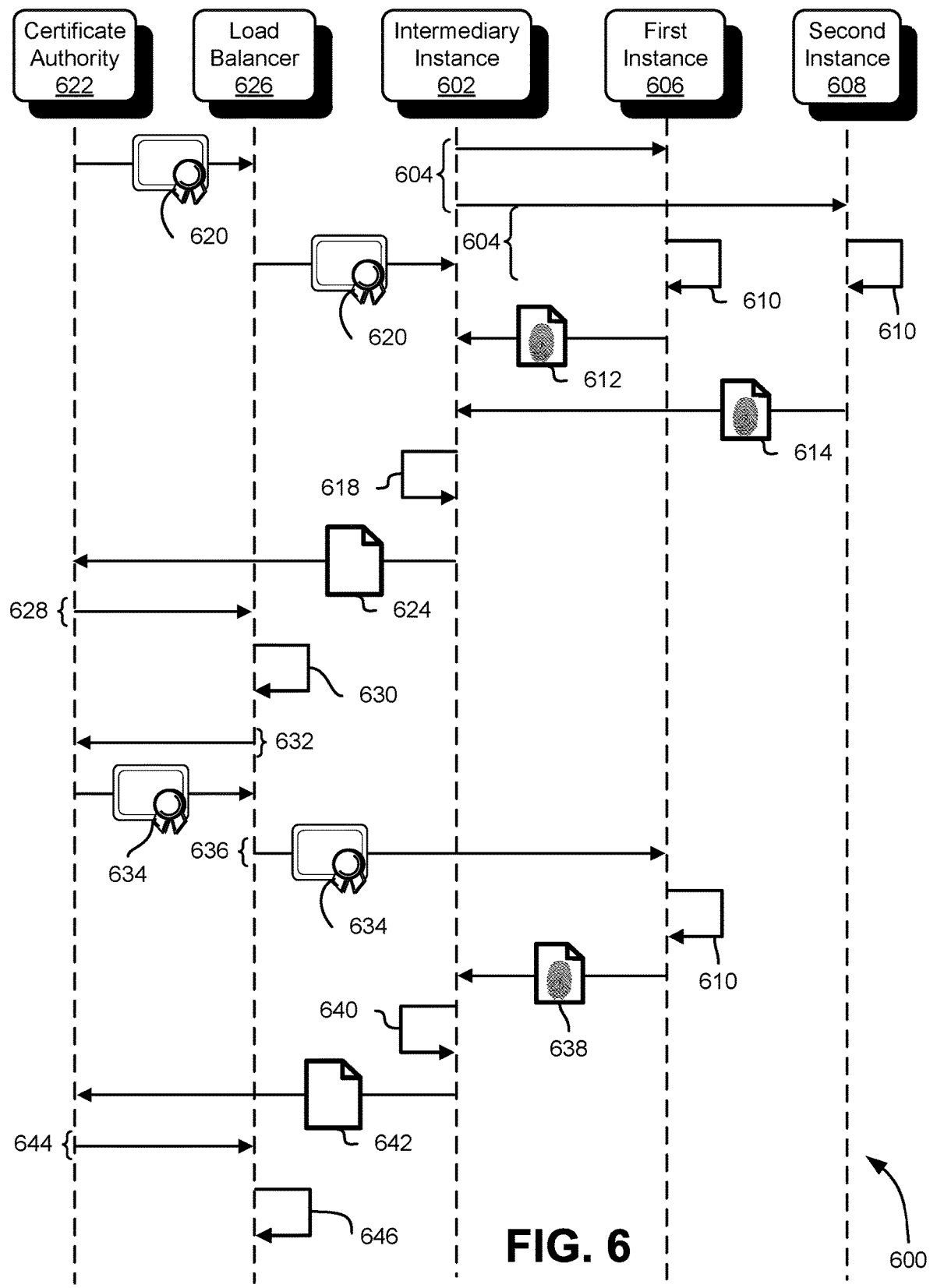
FIG. 6 illustrates a communication diagram for determining and remediating an invalid certificate.

FIG. 6 shows a communication diagram 600 in which various computing resources of a service of a computing resources service provider may communicate to maintain valid digital certificates. An intermediary computer system instance 602, elected according to the processes described above with respect to FIGS. 3 and 4, may send a request 604 to a first computer system instance 606 and a second computer system instance 608 to provide a certificate fingerprint. The first instance 606 and the second instance 608 may then generate 610 a certificate fingerprint using a digital certificate respectively possessed by the first instance 606 and the second instance 608. The first instance 606 may provide a first certificate fingerprint 612 corresponding to the digital certificate it possesses, and the second instance 608 may provide a second certificate fingerprint 614 corresponding to the digital certificate it possesses. The intermediary instance 602 may analyze 618 the first certificate fingerprint 612 and/or the second certificate fingerprint 614 to determine whether they match a certificate fingerprint generated using a digital certificate 620 known to be valid that is provided by a certificate authority 622. The valid certificate 620 may be provided to the intermediary instance 602 by the load balancer 626, which obtains the valid certificate 620 from the certificate authority 622. The intermediary instance 602 may provide results 624 of the analysis 618 to the certificate authority 622. In one embodiment, the intermediary instance 602 may provide the report 624 to the load balancer 626, which in turn provides the report 624 to the certificate authority 622. In this example, it is assumed that the first certificate fingerprint 612 is a mismatch to the certificate fingerprint generated using the current digital certificate 620.

The certificate authority 622 may perform one or more actions based on the results 624 provided. The certificate authority 622 may perform a process to update the certificate for an instance possessing an invalid certificate, such as the first instance 606 in this example, and ensure that the instance does not receive further tasks from the load balancer in the interim. The updating process may be a process performed in parallel for all nodes possessing an invalid certificate. Each computer system instance operating under the load balancer may expose an API to a load balancer 626, the API being usable to update the certificate. The API for example may be in the format UpdateCertificate (Current-_Certificate_Info), where Current_Certificate_Info includes information corresponding to the current certificate. The term "exposing" in this context means to make the API available to an entity where the API would otherwise not be available to the entity.

The process for updating the certificate for computer system instances determined as possessing an invalid certificate. The certificate authority 622 may notify 628 the load balancer 626 that the first instance 606 possesses an invalid certificate. The load balancer 626 may then remove 630 the first instance 606 from the pool of instances to which it distributes data, such that the first instance 606 will not receive additional data until it is verified as possessing a valid digital certificate. The load balancer 626 may send 632 a request to the certificate authority 622 to provide a valid certificate. The certificate authority 622 may provide a valid certificate 634 to the load balancer 626 for distribution to the instances. The load balancer 626 may wait until the first instance 606 has processed all of its requests, which may include coordinating with the load balancer to redirect requests assigned to the first instance 606 to an instance determined as possessing a valid certificate, such as the second instance 608. After the first instance 606 has processed all of its requests such that its request queue is empty, the load balancer 626 may update 636 the certificate possessed by the first instance 606 by providing or otherwise making the valid certificate 634 available to the first instance 606. As one example, the load balancer 626 may access the UpdateCertificate API of the first instance 606 and provide a valid certificate 634. In one embodiment, the load balancer 626 may provide the valid certificate 620 previously obtained to the first instance 606 to ensure that the certificate is still current.

The first instance 606 may thereafter generate and provide a certificate fingerprint 638 of the valid certificate 634 to the intermediary instance 602 in order to join or be added to a record of computer system instances authorized to exchange data with the load balancer by virtue of possessing a valid certificate 634. For example, the first instance 606 may provide a request to join the pool of distribution for the load balancer 626 to the intermediary instance 602 in association with the certificate fingerprint 638. Being added to the record may include the intermediary instance 602 analyzing 640 the certificate fingerprint 638 to determine whether it matches a certificate fingerprint generated using the current digital certificate 634 (or 620), and providing results 642 to the certificate authority 622 indicating that the certificate 634 possessed by the first instance 606 is valid. In one embodiment, the intermediary instance 602 may provide the report 642 to the load balancer 626, which in turn provides the report 642 to the certificate authority 622. Thereafter, the certificate authority 622 may send 644 a notification to the load balancer 626 that the first instance 606 possesses a valid certificate. Accordingly, the load balancer 646 may then add the first instance 606 to the record of computer system instances to which the load balancer 626 may distribute data.

According to the techniques described above, the load balancer may continue to distribute data to computer system instances possessing valid certificates while, in parallel, computer system instances determined as possessing invalid certificates are updated to possess valid certificates. In short, this allows the service to continue running and handling traffic while the certificates are updated for the instances possessing invalid certificates. This helps to prevent disruptions to services while certificates are updated and customer experience is not adversely affected.

Figure 7:
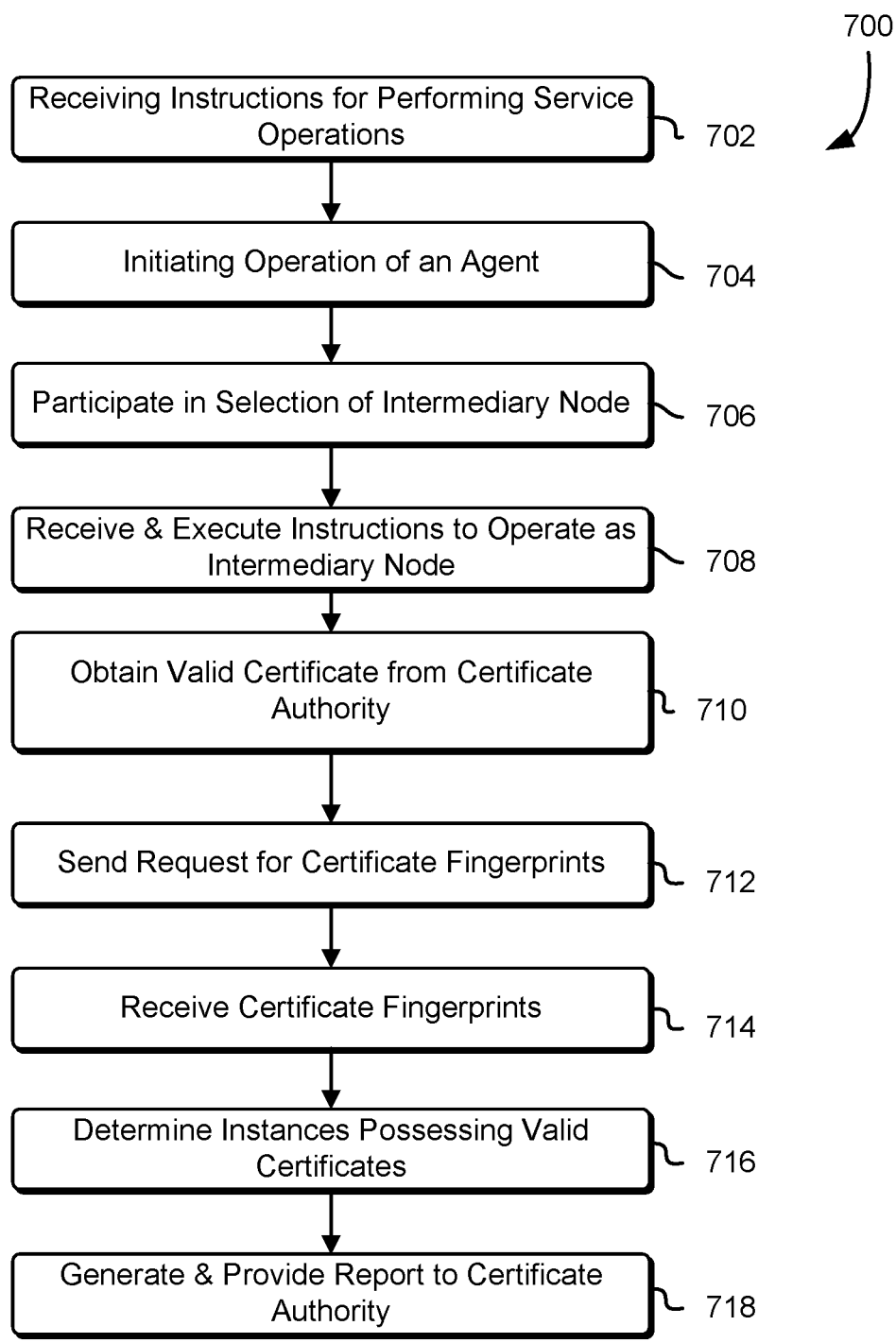
FIG. 7 illustrates a process for instantiating an intermediary computer system instance.

FIG. 7 illustrates a process 700 performed by the intermediary instance for determining which instances possess a valid certificate. The process 700 begins by receiving 702, at an instance, instructions that enable performance of operations for a particular service, such as the cryptographic service, the data storage service, or the electronic commerce service, as described above with respect to FIG. 1. The instructions may include instructions for operating an agent within the instance, as described above respect to FIGS. 5 and 6. The agent operating on the instance may communicate with agents operating on other instances of the service. Next, the instance may initiate 704 operation of the agent within the instance, such as by executing a script specifying instructions for starting the agent. The instance may then participate 706 and selection of an intermediary, as described above with respect to FIGS. 3 and 4. In this example, the instance performing the process 700 is elected by a set of instances operating under the service to be an intermediary node. The instance may then receive and execute 708 instructions causing the instance to operate as the intermediary node.

The intermediary node may then obtain 710 a valid certificate from the certificate authority described above with respect to FIGS. 2 and 5, for example. The intermediary instance may then send 712 a request to the instances operating under the service to provide a fingerprint of the certificate that they possess. The request may be sent from the agent of the intermediary instance to the agents of the other instances operating under the service. The intermediary instance then receives 714 certificate fingerprints from the other instances. The certificate fingerprints may be received by the agent of the intermediary instance from the agents of the other instances.

The intermediary instance may then determine 716 which of the other instances possess valid certificates, and may determine which the instances possess invalid certificates. Determination of the instances in step 716 may include determining which agents of the other instances failed to respond to the request for certificate fingerprints. The determination 716 may also include comparing a certificate fingerprint generated using a valid certificate, as described above with respect to FIG. 5, with each of the certificate fingerprints received from the other instances. The intermediary instance may then generate 718 and provide a report indicating validity of the certificates possessed by the other instances. The report generated 718 may include identification information (e.g., instance name, instance address) for each of the instances in association with a validity result for the certificate possessed by the respective instances. The validity result may indicate, for example, whether the certificate is valid or invalid. The report may also include information identifying the certificate associated with each instance, such as a certificate version or a time period for which the certificate is valid. The report may be provided to the certificate authority by the agent of the intermediary instance.

Figure 8:
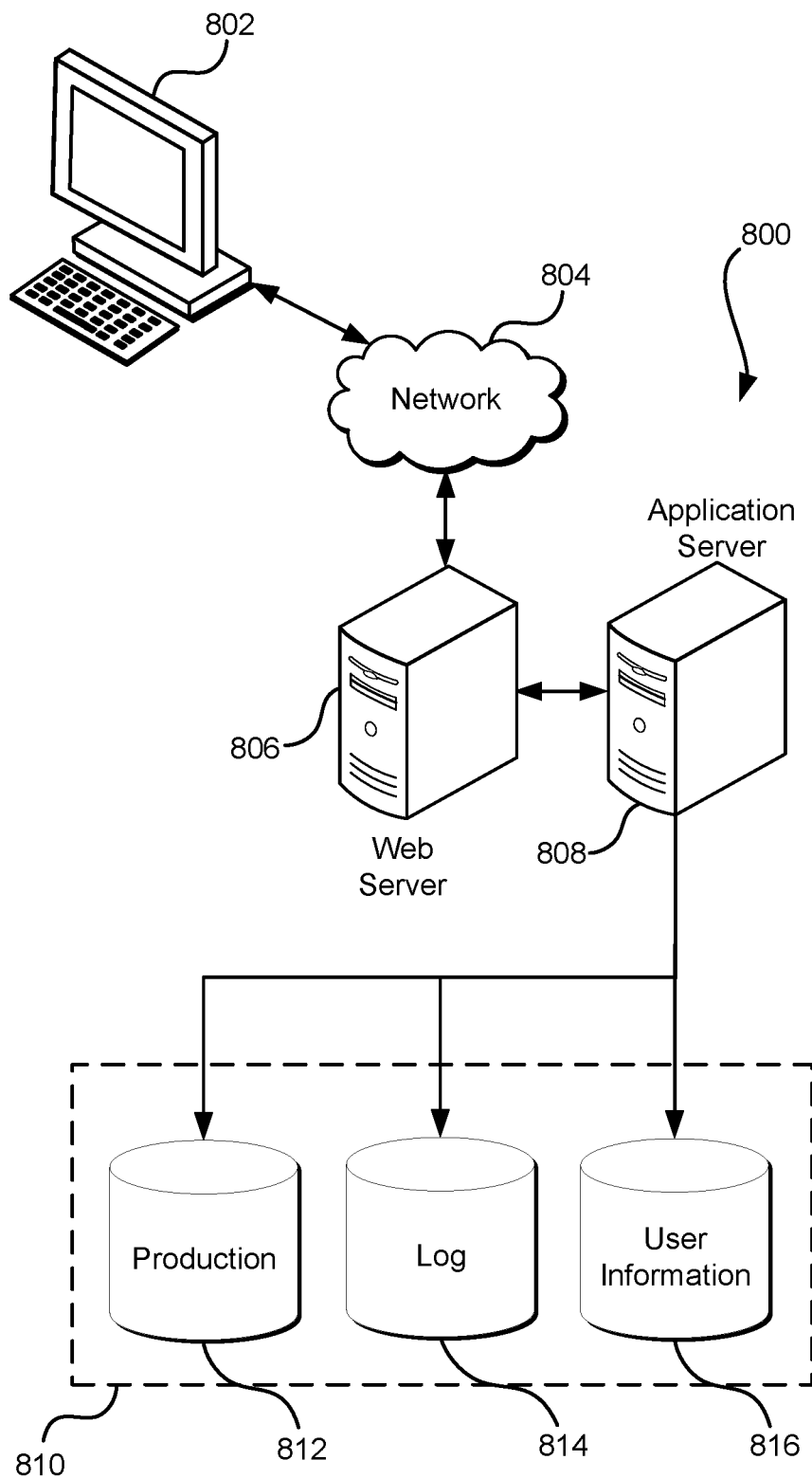
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a server of a cluster of servers behind a load balancer, instructions to operate as a certificate scanning node;
   obtaining a first certificate fingerprint of a valid digital certificate, the valid digital certificate issued by a certificate authority;
   receiving a set of certificate fingerprints from individual servers of the cluster of servers, the set of certificate fingerprints comprising a second certificate fingerprint received with identification information that identifies servers of the cluster of servers;
   determining that a server of the cluster of servers possesses an invalid digital certificate, based at least in part on a comparison of the first certificate fingerprint with the second certificate fingerprint; and
   generating, based at least in part on the determining and the identification information, a record indicating that the server possesses the invalid digital certificate.

2. The computer-implemented method of claim 1, wherein the set of certificate fingerprints are received in response to a request to a subset of servers of the cluster of servers for the set of certificate fingerprints.

3. The computer-implemented method of claim 1, further comprising:
   receiving a request to participate in selection of the certificate scanning node; and
   providing a selection of a server from the cluster of servers.

4. The computer-implemented method of claim 1, wherein the record indicates that a set of servers of the cluster of servers possesses the valid digital certificate.

5. The computer-implemented method of claim 1, further comprising providing the record to the certificate authority.

6. A non-transitory computer-readable storage medium having stored thereon executable instructions that, as a result of execution by one or more processors of a computer system, cause the computer system to at least:
   receive, at a first server of a plurality of servers, instructions to operate as a certificate scanning node;
   obtain a first certificate fingerprint generated at least in part from a valid certificate;
   obtain a set of certificate fingerprints from individual servers of the plurality of servers, the set of certificate fingerprints comprising a second certificate fingerprint associated with a second server;
   generate a determination that the second server possesses a valid digital certificate based at least in part on a comparison of the first certificate fingerprint with the second certificate fingerprint; and
   indicate, based at least in part on the determination, that the individual servers of the plurality of servers possess valid digital certificates.

7. The non-transitory computer-readable storage medium of claim 6, wherein the indication that the individual servers of the plurality of servers possess the valid digital certificates includes identification information for the plurality of servers and validity results for the digital certificates possessed by the individual servers of the plurality of servers.

8. The non-transitory computer-readable storage medium of claim 6, wherein the computer system causes an agent running on a particular server of the plurality of servers to be restarted based at least in part on an absence of a response to a health check query sent to the agent.

9. The non-transitory computer-readable storage medium of claim 6, wherein the indication causes the computer system to cause one or more nodes to cease receiving data from a load balancer, the one or more nodes determined to not possess the valid certificate based at least in part on the indication.

10. The non-transitory computer-readable storage medium of claim 6, further comprising operating an agent that communicates with other agents operating on the plurality of servers, wherein the set of certificate fingerprints is received by the agent from the other agents of the plurality of servers.

11. The non-transitory computer-readable storage medium of claim 6, further comprising providing an indication, to the plurality of servers, of a new certificate scanning node to replace the certificate scanning node.

12. A system, comprising:
at least one computing device implementing one or more services, wherein the one or more services:
receive, at a first server of a plurality of servers, instructions to operate as a certificate scanning node;
obtain a first certificate fingerprint generated at least in part from a valid certificate;
obtain a set of certificate fingerprints from individual servers of the plurality of servers, the set of certificate fingerprints comprising a second certificate fingerprint associated with a second server;
generate a determination that the second server possesses a valid digital certificate based at least in part on a comparison of the first certificate fingerprint with the second certificate fingerprint; and
indicate, based at least in part on the determination, that the individual servers of the plurality of servers possess valid digital certificates.

13. The system of claim 12, wherein the one or more services further cause one or more servers to install an agent and instructions for performing one or more actions in fulfillment of requests to the first server.

14. The system of claim 12, wherein servers of the plurality of servers are determined to be participating in the election based at least in part on sending a request to the servers of the plurality of servers to provide a participation status for selecting the first server.

15. The system of claim 12, wherein a service proposes, to the set of servers participating in the election, a proposal for a server of the plurality of servers to be the first server, and the selection includes an indication of approval or disapproval of the proposal.

16. The system of claim 12, wherein the system comprises a load balancer for distributing network traffic to the plurality of servers, the plurality of servers implementing an internet protocol architecture.

17. The system of claim 12, wherein the one or more services further cause servers not indicated as possessing a valid certificate to be removed from a record identifying servers authorized to receive data from a load balancer of the one or more services.

18. The system of claim 17, wherein the one or more services further provide a new certificate to the servers not indicated as possessing the valid certificate through an interface exposed to the system.

19. The system of claim 12, wherein the one or more services send a participation query to agents of the plurality of servers to provide an indication of whether individual servers will participate in the selection of the first server.

20. The system of claim 12, wherein the one or more services determine whether the plurality of servers satisfy a condition for selecting the first server, and the system initiates one or more remediation actions in response to determining that the condition is not satisfied.

* * * * *